(12) United States Patent
Coulombe

(10) Patent No.: US 7,909,669 B2
(45) Date of Patent: Mar. 22, 2011

(54) DIFFERENTIAL DISPLACEMENT DEVICE UNDER SIMULTANEOUS AND REPETITIVE ELECTROMAGNETIC REPULSIVE FORCES

(76) Inventor: Maurice Coulombe, Québec (CA)

( * ) Notice: Subject to any disclaimer, the term of this patent is extended or adjusted under 35 U.S.C. 154(b) by 0 days.

(21) Appl. No.: 12/800,117

(22) Filed: May 10, 2010

(65) Prior Publication Data

US 2010/0291812 A1  Nov. 18, 2010

Related U.S. Application Data

(60) Provisional application No. 61/213,210, filed on May 18, 2009.

(51) Int. Cl.
*B63H 21/17* (2006.01)
(52) U.S. Cl. ............ 440/6; 440/113; 310/20; 310/80; 310/75 R
(58) Field of Classification Search ............ 440/6, 113; 310/20, 80, 75 R
See application file for complete search history.

(56) References Cited

U.S. PATENT DOCUMENTS

| | | | | |
|---|---|---|---|---|
| 1,743,978 A | * | 1/1930 | Quisling ............ | 440/13 |
| 4,151,431 A | * | 4/1979 | Johnson ............ | 310/12.24 |
| 4,305,448 A | * | 12/1981 | Stoll ............ | 160/331 |
| 4,488,477 A | * | 12/1984 | Miyamoto ............ | 92/85 R |
| 4,754,691 A | * | 7/1988 | Rogerson ............ | 91/275 |
| 4,876,945 A | * | 10/1989 | Stoll et al. ............ | 92/5 R |
| 4,889,035 A | * | 12/1989 | Goodnow ............ | 91/275 |
| 5,036,930 A | * | 8/1991 | Bisel et al. ............ | 180/65.1 |
| 6,142,090 A | * | 11/2000 | Jakuba et al. ............ | 114/65 R |
| 6,716,074 B2 | * | 4/2004 | Coulombe ............ | 440/6 |

* cited by examiner

*Primary Examiner* — Stephen Avila

(74) *Attorney, Agent, or Firm* — Francois Martineau

(57) ABSTRACT

A differential displacement electromagnetic device providing motion over a support frame. Permanent electromagnets are fixedly mounted to a carriage and angularly oriented relative to the support frame lengthwise axis. Upright anchor columns project transversely from the support frame, and are interconnected by tension springs. A movable block is slidingly carried over both rails including a pair of opposite side spring loaded arms, carrying floating electromagnets. A bracket mount carries two spaced pivotal axles, and pivotally mounted rocker arms carrying corresponding permanent magnet. The rocker arms are sized in such a way as to be pivotably movable between a first limit position, where the permanent magnets abut against the angularly oriented electromagnets, and a second limit position, where the permanent magnets abut against the floating electromagnets.

9 Claims, 8 Drawing Sheets

DIFFERENTIAL DISPLACEMENT DEVICE UNDER SIMULTANEOUS AND REPETITIVE ELECTROMAGNETIC REPULSIVE FORCES

CROSS-REFERENCE DATA

This application claims convention priority based upon provisional U.S. patent application No. 61/213,210 filed May 18, 2009.

FIELD OF THE INVENTION

This invention relates to electromagnets assemblies for displacement in space of physical bodies, and in particular to an improvement over applicant's granted U.S. Pat. No. 6,716,074 issued 6 Apr. 2004.

BACKGROUND OF THE INVENTION

In watercrafts, a substantial amount of the energy required for forward thrust (e.g. with rearwardly located blade impellers) thereof is wasted due to drag-induced frictional forces, and in particular from the underlying body of water on the watercraft hull. Alternate methods of imparting thrust to a watercraft in a way that would reduce drag, would be welcome.

Sailboats tend to be more efficient than powerboats, but they depend upon the whims of the wind, so they cannot be relied upon to go from A to B in a set time. Hydrofoils or hovercrafts are also quite efficient, but are very noisy and their distribution has always remain quite limited because of their inherent technical limitations. Use of electromagnets in transport has been demonstrated with so-called "maglev" trains tested in Japan and China, where the trains levitate at a very low altitude over the rail again to reduce frictional forces. However, these magnetic levitation trains remain for the time being mainly experimental except in China, due to several major as yet unsolved technical challenges.

A magnet is a body that attracts iron and certain other material, by virtue of a surrounding field of force produced by the motion of its atomic electrons and the alignment of its atoms. An electromagnet, in turn, is a magnet (consisting essentially of a soft-iron core) wound with a current-carrying coil of insulated wire, the current in which produces the magnetization of the core. Accordingly, the electromagnet generates an electromagnetic field of force associated with an accelerating electric charge, having both electric and magnetic components and containing a definite amount of electromagnetic energy.

OBJECTS OF THE INVENTION

The gist of the present invention is thus to enhance the propulsive force imparted to a vehicle or watercraft by the present magnetic differential displacement device, and in particular a doubling of said propulsive force relative to that produced by the device disclosed in U.S. Pat. No. 6,716,074.

A corollary object of this invention is to lower energy consumption required for operation of said magnetic differential displacement device.

Other objects of the invention include reducing the size of the present invention device, and minimizing magnetic force induced play of the slidable carriage forming part of this invention.

SUMMARY OF THE INVENTION

In accordance with the object of the invention, there is disclosed a differential displacement electromagnetic device providing motion over a support frame, said device comprising: —a planar rectangular support frame defining a lengthwise axis and a central aperture; —first and second integral rails fixedly mounted to said support frame in spacedly parallel fashion relative to one another; —an open quadrangular carriage, spacedly overhanging over said support frame in sliding fashion; —permanent electromagnets, fixedly mounted to opposite ends of said carriage and angularly oriented relative to said support frame lengthwise axis; —second pair of first and second pairs of upright anchor columns, mounted to and projecting transversely from opposite ends of said support frame, said first pair of anchor columns interconnected by first biasing means, while said second pair of anchor columns interconnected by second biasing means; —a movable block, slidingly carried over both said rails and sized to freely engage said support frame aperture for sliding motion thereabout independently of said carriage, said block including a pair of opposite side spring loaded arms, extending outwardly over and beyond said carriage and carrying at each of their opposite ends a pair of opposite floating electromagnets, said floating electromagnets hanging freely spacedly over said support frame and clearing said casing; said block further including a bracket mount carrying two spaced pivotal axles defining pivotal axes transverse to the plane of said support frame, and a pair of fixed rocker arms, pivotally mounted to said block at one end by pivotal axles with each rocker arms carrying at each of their opposite ends a corresponding permanent magnet; wherein said rocker arms are sized in such a way as to be pivotably movable between a first limit position, where said permanent magnets abut against said angularly oriented electromagnets, and a second limit position, where said permanent magnets abut against said floating electromagnets.

Preferably, said permanent electromagnets fixedly mounted to opposite ends of said carriage are angularly oriented relative to said support frame lengthwise axis by an angular value of about 45°.

Preferably, said bracket mount carries two spaced pivotal axles being orthogonal to the plane of said support frame;

Preferably, said carriage and said block are of substantially the same mass.

The present device could be used in combination with a watercraft, wherein said support frame is fixedly mounted to a lower deck floor of said watercraft; wherein preferably, in operation, said carriage is accelerated linearly in a direction opposite said angularly oriented electromagnets, while said permanent magnets have been accelerated during pivotal motion of said rocker arms, to eventually abut against and remain connected to registering said floating electromagnets, thus bringing a further acceleration of said carriage away from said angularly oriented electromagnets. Preferably, said acceleration ratio of said carriage away from said angularly oriented electromagnets is of about 1 to 1.41.

Preferably, first and second pairs of additional permanent magnets are provided, each fixedly mounted to a corresponding one of the two said pairs of said upright anchor columns, said first pair of additional permanent magnets being in spaced register with one another and producing repulsive magnetic forces relative to one another, said second pair of additional permanent magnets being in spaced register with one another and producing repulsive magnetic forces relative to one another, said first and second pairs of additional permanent magnets improving smoothness in operation of said first and second biasing means.

The invention also relates to a method of use of a differential displacement electromagnetic device as disclosed hereinabove providing motion over a support frame, wherein said method of use comprises the following steps:

a) at rest, said permanent magnets abut on said angularly oriented electromagnets;

b) a computer control system then applies electrical current to the diverging said angularly oriented electromagnets bringing about a repulsive force on registering said permanent magnets so that the latter move away from angularly oriented electromagnets;

c) simultaneously, said carriage is accelerated linearly in a direction opposite said angularly oriented electromagnets while said permanent magnets have been accelerated during pivotal motion of said rocker arms along their circle of arc, to eventually come to abut against and remain connected to registering said floating electromagnets, thus bringing a further acceleration of said carriage away from said angularly oriented electromagnets;

d) just before said floating electromagnets reach said permanent magnets, said computer control means apply electric current onto said floating electromagnets, which thus brings about simultaneously four electromagnetic repulsion forces: two repulsive forces are applied onto said rocker arms magnets on the one hand, and two other repulsive forces are applied onto said permanent magnets on the other hand; and e) the return pivotal motion of said rocker arms occurs, away from said floating electromagnets and displacement of said carriage and of said block occurs toward said angularly oriented electromagnets to bring all components of the present device to their original position of step (a), ending the cycle.

DETAILED DESCRIPTION OF THE PREFERRED EMBODIMENT OF THE INVENTION

Figure 2:
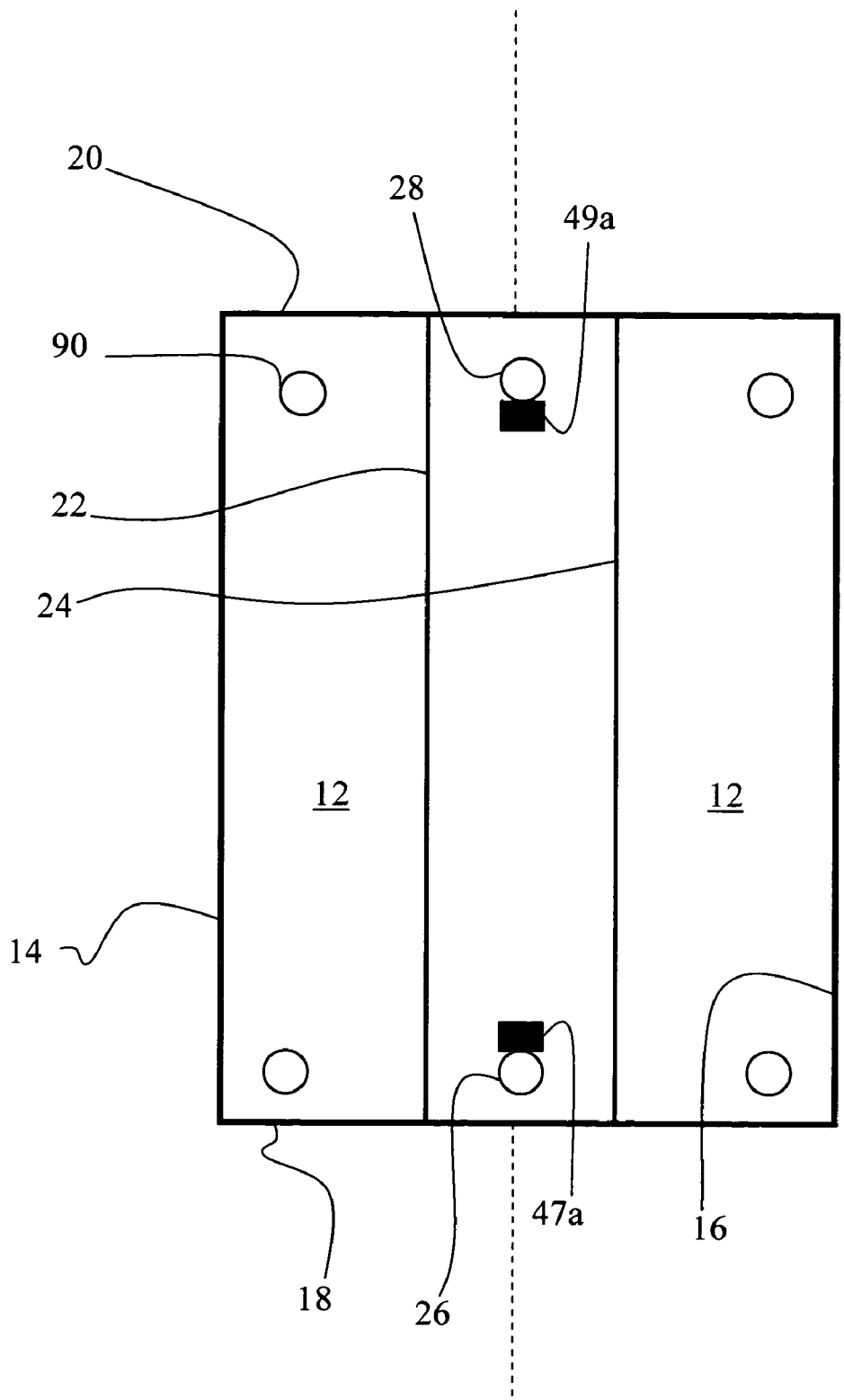
FIG. 2 is an enlarged top plan view of a support frame forming part of the electromagnetic device of FIG. 1.

The present device 10 comprises a planar rectangular support frame 12 (FIG. 2) having opposite long side edges 14, 16, and one another opposite short end edges 18, 20. Two integral rails 22, 24, extend from end edge 18 to end edge 20, spacedly parallel to one another and to side edges 14, 16, at an intermediate position relative thereto. Upright anchor columns 26, 28, are mounted to and project transversely from the plane of planar frame 12 at a location intermediate rails 22, 24, and adjacent edges 18, 20.

Figure 3:
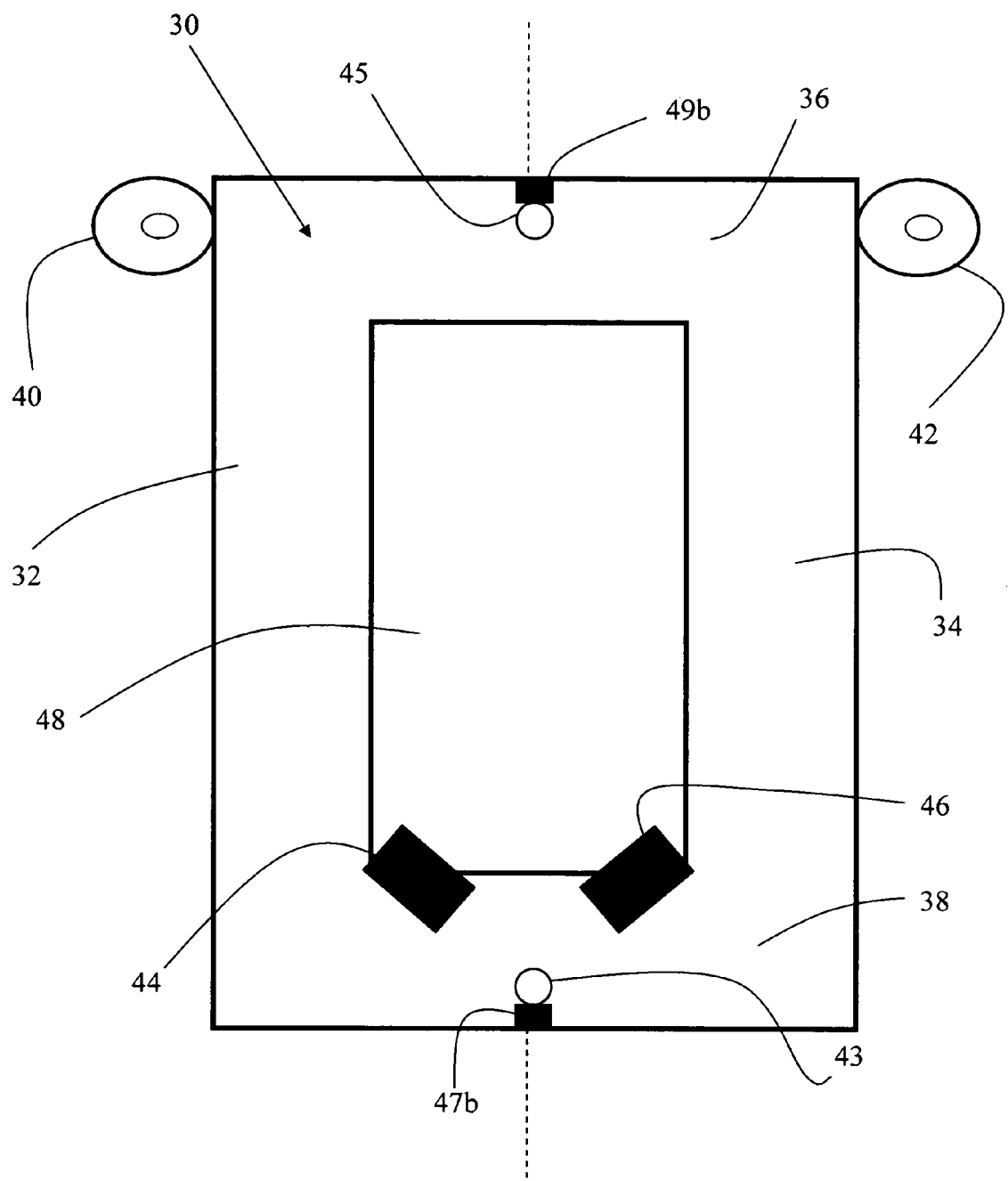
FIG. 3 is a top plan view, at the scale of FIG. 1, of a carriage forming part of the electromagnetic device of FIG. 1.

An open quadrangular carriage 30 (FIG. 3) is further provided, comprising two opposite side legs 32, 34, and two opposite transverse legs 36, 38, joining the ends of side legs 32, 34, wherein a central aperture 48 is formed therebetween.

Carriage 30 is sized and designed to spacedly overhang over support frame 12 and to be slidingly carried over support frame rails 22, 24, by its transverse legs 36, 38, for sliding motion of carriage 30 between opposite end edges 18 and 20 of support frame 12. Permanent magnets 40, 42, are fixedly mounted to the opposite ends of transverse leg 36, and are oriented parallel to the main lengthwise axis of the present device. Electromagnets 44, 46, are further fixedly carried to intermediate sections of transverse leg 38, spacedly from one another. Electromagnets 44, 46, are angular oriented relative to the lengthwise main axis of device 10, preferably by about 45°.

Figure 6:
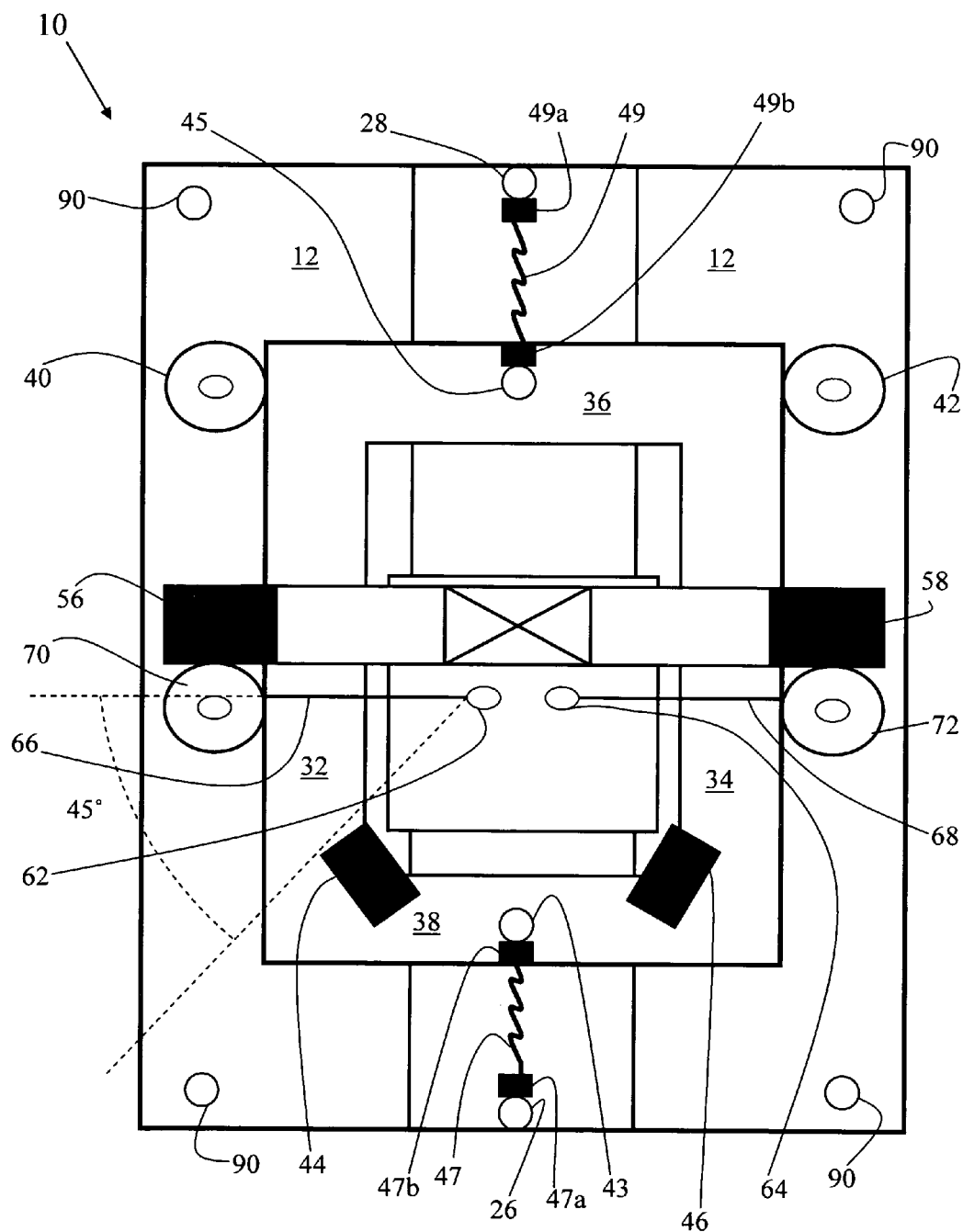
Figure 7:
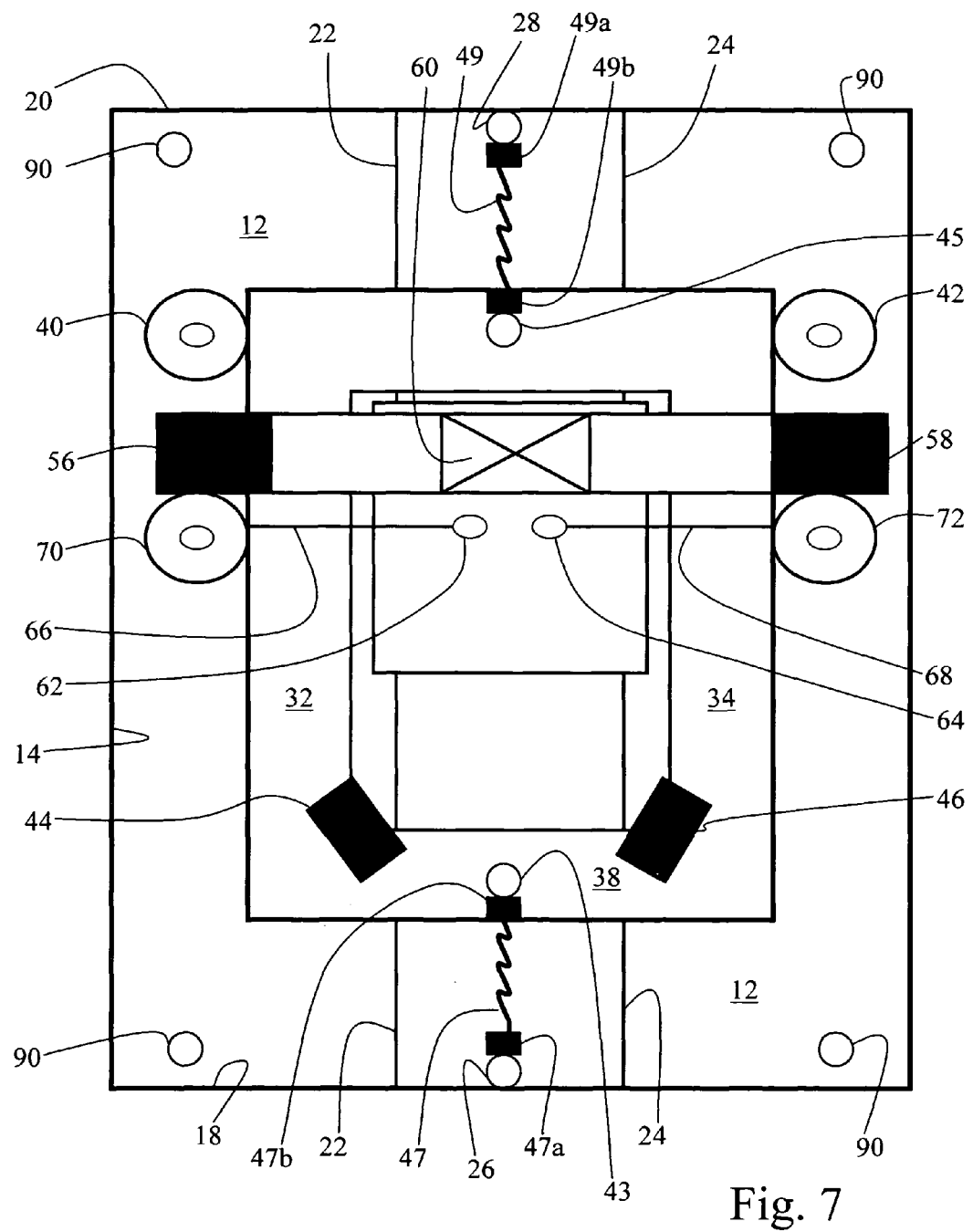

As best shown in FIGS. 6 and 7, upright anchor columns 43, 45, are mounted to and project transversely from the plane of legs 36, 38, at a location intermediate legs 34, 32. Column 43 is connected to column 26 by a tension spring member 47, while column 45 is connected to column 28 by tension spring member 49.

Preferably, permanent magnets 47a, 47b, 49a, 49b are further fixedly mounted onto each corresponding upright anchor columns 26, 43, 28, 45, respectively. The pair of spacedly registering permanent magnets 49a, 49b, produce repulsive magnetic forces relative to one another; while the pair of spacedly registering permanent magnets 47a, 47b, also produce repulsive magnetic forces relative to one another. The purpose of adding permanent magnets 47a, 47b, and 49a, 49b, to anchor columns 26, 43, 28, 45, is to provide smoother operation of tension springs 47 and 49 by providing partial effort relief thereto.

A movable block 50 (FIG. 4) is further provided, slidingly carried over rails 22, 24 and sized to freely engage into the quadrangular aperture 48 for sliding motion between legs 36 and 38. Accordingly, block 50 is movable over rails 22, 24, independently of carriage 30. Block 50 includes opposite side spring loaded arms 52, 54 in FIG. 4, extending outwardly over and beyond carriage side legs 32, 34 and carrying at each of their opposite ends a pair of opposite floating electromagnets 56, 58. Electromagnets 56, 58, hang freely spacedly over support frame 12, clearing side legs 32, 34. Block 50 further includes a bracket mount 60 carrying two spaced pivotal axles 62, 64, orthogonal to the plane of support frame 12.

Larger carriage 30 and smaller block 50 are preferably of the same mass, to enable optimal performance of the present device.

Figure 4:
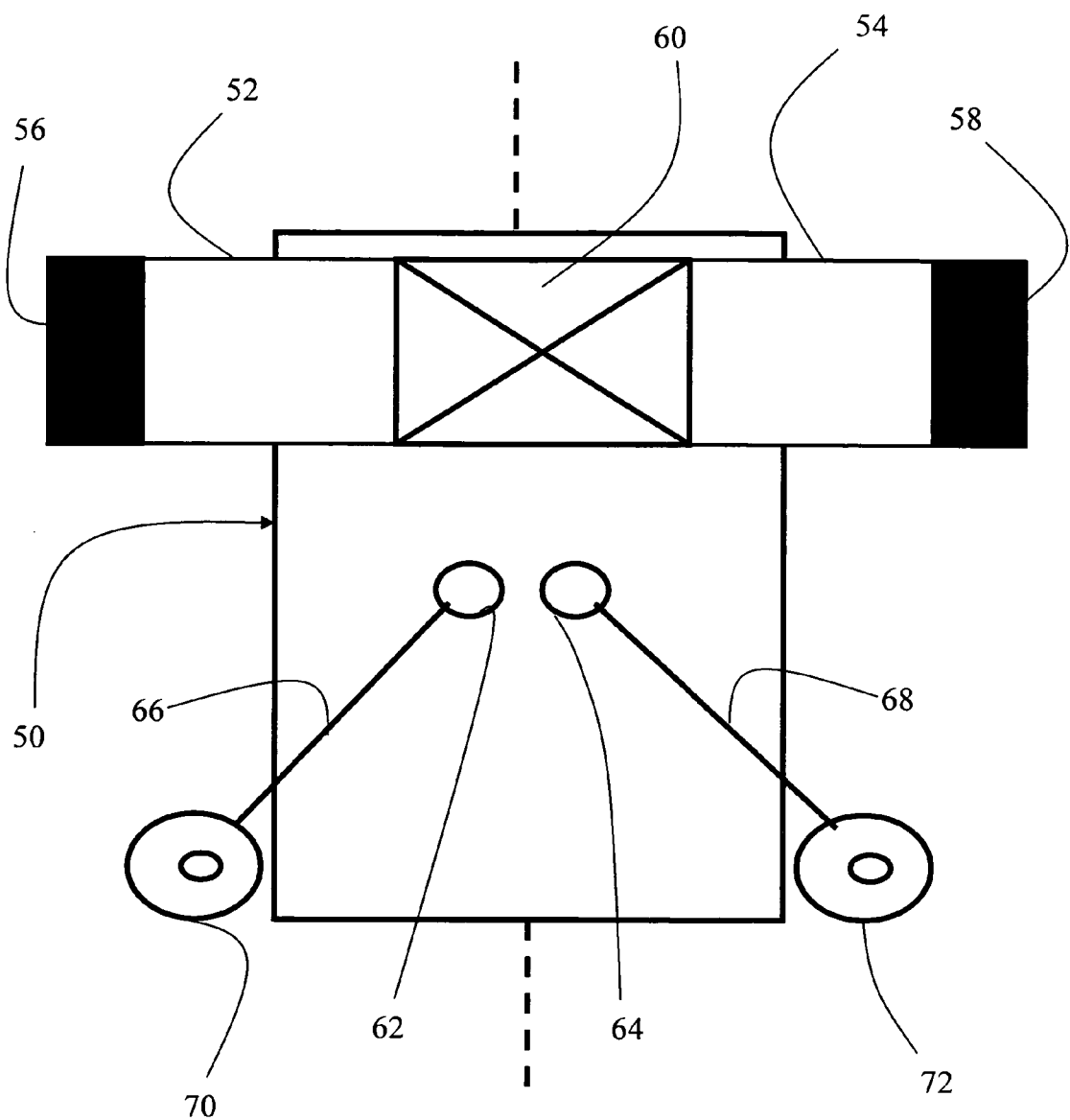
FIG. 4 is a top plan view of the central block and associated spring loaded arms forming part of the electromagnetic device of FIG. 1.

As illustrated in FIG. 4, block 50 extends downwardly beyond the plane of arms 52, 54, and pivotal axles 62, 64, clear the latter. Fixed rocker arms 66, 68, are pivotally mounted at one end by pivotal axles 62, 64, and carry at each of their opposite ends permanent magnets 70, 72. As suggested in FIGS. 5 and 6, rocker arms 66, 68, are sized in such a way as to be pivotally movable between a first limit position, shown in FIG. 5, where permanent magnets 70, 72, abut against the outward face (closest to side edges 32, 34) of electromagnets 44, 46, and a second limit position, illustrated in FIG. 6, where permanent magnets 70, 72, abut against electromagnets 56, 58, on the side thereof facing leg 38.

Figure 1:
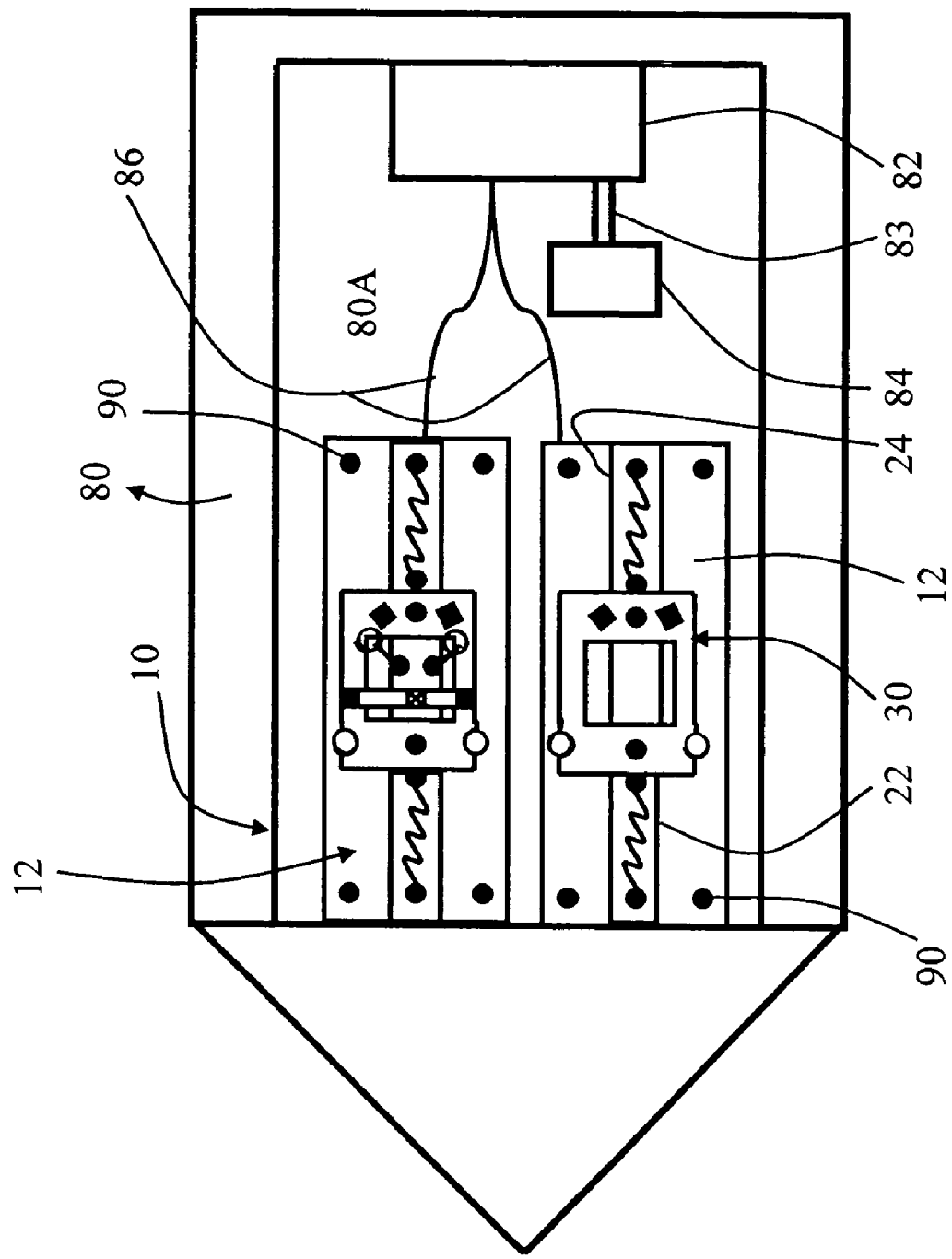
FIG. 1 is a schematic top plan view of a watercraft provided with an electromagnetic device for providing enhanced motion and/or thrust thereto.

The present device 10 may be mounted to a vehicle, for example by anchoring with bolts 90 planar frame 12 flatly against a lower deck floor 80A of a watercraft 80 (FIG. 1). The purpose of tension springs 47, 49, is to transform resultant vector force from differential displacement of carriage 30 and block 50 into motion and/or forward thrust to watercraft 80. An electrical battery 82 monitored by suitable computer control means 84 via line 83 is mounted into the watercraft 80, and operatively connected by electrical lines 86 to the present magnetic device 10. The battery 82 enables production of electromagnetic repulsive forces between the electromagnets 44, 46, and 56, 58, and the permanent magnets 40, 42 and 70, 72, respectively of the present device 10.

Figure 5:
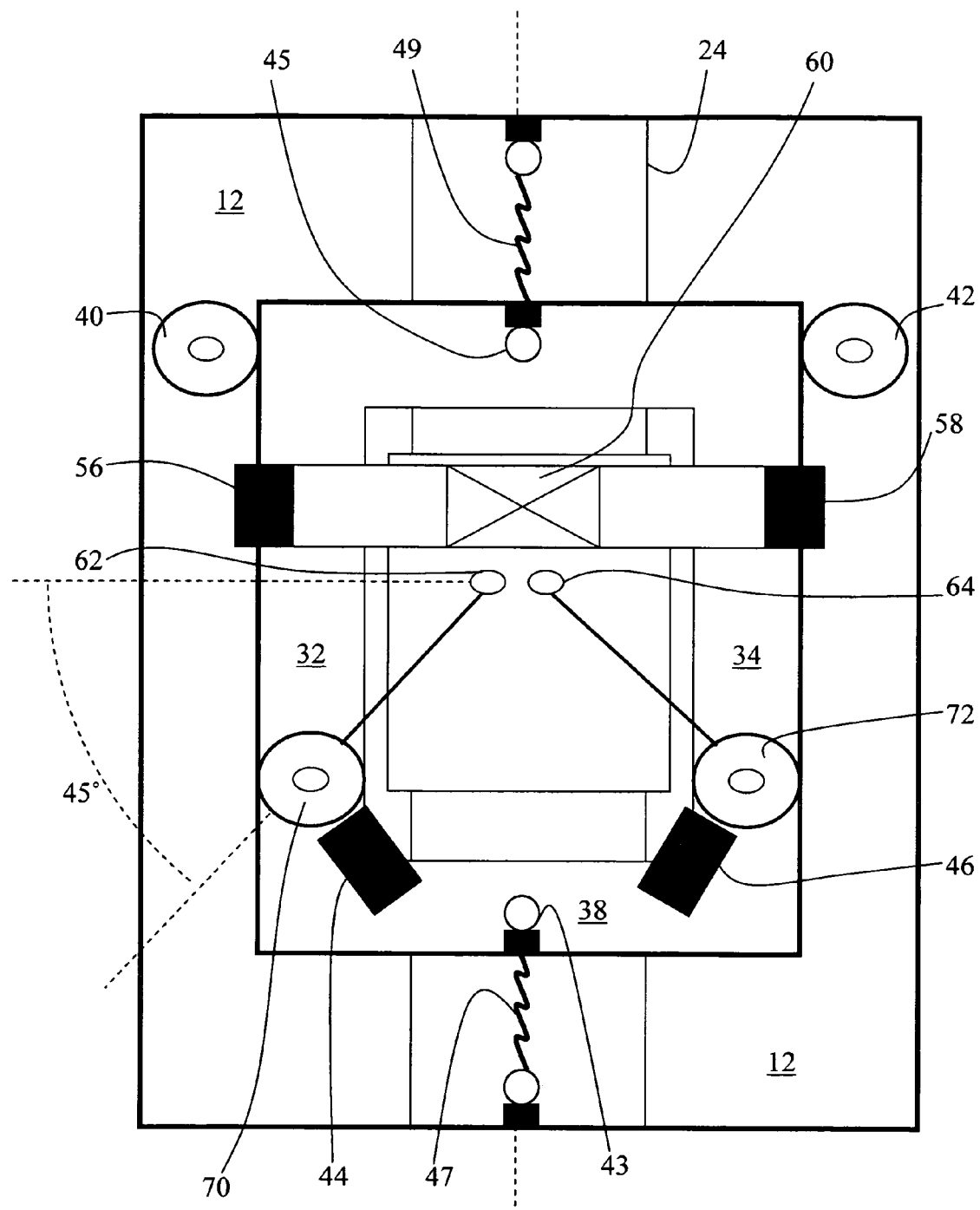
FIGS. 5 to 7 are schematic top plan views of the electromagnetic device of the present invention, with FIGS. 6 and 7 being at an enlarged scale, and FIGS. 5 to 7 sequentially suggesting how the magnetic force induced carriage and central block relative motion occurs.
Figure 5A:
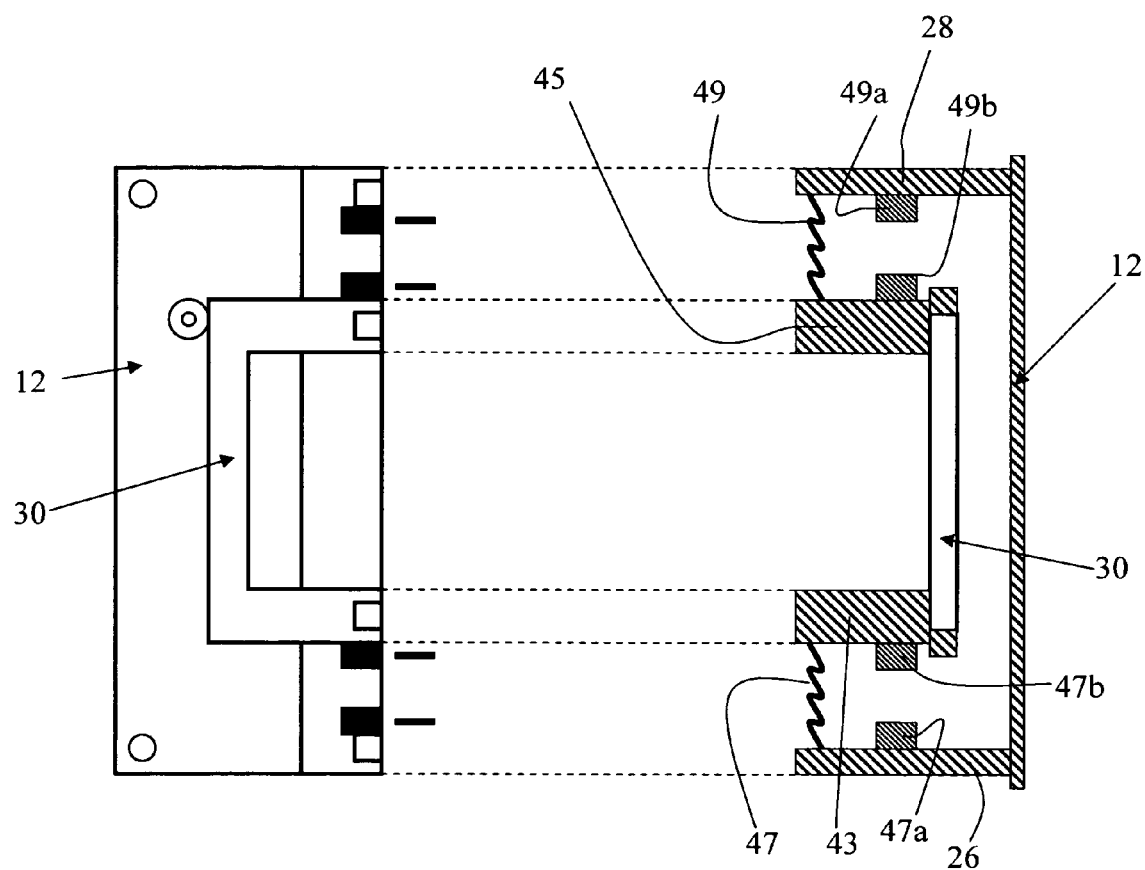
FIG. 5A is a view similar to FIG. 5, but with the support frame cut in half and spread apart, and with the central block and spring loaded arms being removed.

In operation:

At rest, permanent magnets 70, 72, abut on electromagnets 44, 46, as illustrated in FIG. 5.

computer control system 84 then applies electrical current to the diverging electromagnets 44, 46, bringing about a repulsive force on registering permanent magnets 70, 72, so that magnets 70, 72, move away from electromagnets 44, 46;

simultaneously, carriage 30 is accelerated linearly in a direction opposite electromagnets 44, 46, while heavy weight magnets 70, 72, have been accelerated during pivotal motion of rocker arms 66, 68, along their 45° circle of arc, to eventually abut against and remain connected to registering floating electromagnets 56, 58 (FIG. 6), thus bringing a further acceleration of carriage 30 away from electromagnets 44, 46. Preferably, this acceleration ratio is of 1 to 1.41.

Just before the floating electromagnets 56, 58, reach the permanent magnets 40, 42 (FIG. 7), the computer control means 84 apply electric current onto floating electromagnets 56, 58, which thus brings about simultaneously four electromagnetic repulsion forces. Two repulsive forces are applied onto permanent magnets 70, 72, on the one hand, and two other repulsive forces are applied onto permanent magnets 40, 42, on the other hand.

The return pivotal motion of the rocker arms 66, 68, occurs, away from electromagnets 56, 58, and displacement of carriage 30 and of block 50 occur toward electromagnets 44, 46, to bring all components to their original position of FIG. 5 once again, ending the cycle.

In a motor vehicle (not shown) for use on a road, the present differential displacement device could be use to dampen the centrifugal forces applied to the motor vehicle when the motor vehicle engages with speed into curbs. This differential acceleration is borne by a pair of electromagnets pivotally mounted to one of the movable modules for acceleration in a direction arcuately transverse to that of the displacement of the movable modules, so that one module moves faster than the other for a same force applied to both modules and even though both modules have the same mass.

The invention claimed is:

1. A differential displacement electromagnetic device providing motion over a support frame, said device comprising:
    a planar rectangular support frame defining a lengthwise axis and a central aperture;
    first and second integral rails fixedly mounted to said support frame in spacedly parallel fashion relative to one another;
    an open quadrangular carriage, spacedly overhanging over said support frame in sliding fashion;
    permanent electromagnets, fixedly mounted to opposite ends of said carriage and angularly oriented relative to said support frame lengthwise axis;
    two first and second pairs of upright anchor columns, mounted to and projecting transversely from opposite ends of said support frame, said first pair of anchor columns interconnected by first biasing means, while said second pair of anchor columns interconnected by second biasing means;
    a movable block, slidingly carried over both said rails and sized to freely engage said support frame aperture for sliding motion thereabout independently of said carriage, said block including a pair of opposite side spring loaded arms, extending outwardly over and beyond said carriage and carrying at each of their opposite ends a pair of opposite floating electromagnets, said floating electromagnets hanging freely spacedly over said support frame and clearing said casing; said block further including a bracket mount carrying two spaced pivotal axles defining pivotal axes transverse to the plane of said support frame, and a pair of fixed rocker arms, pivotally mounted to said block at one end by pivotal axles 62, 64, with each rocker arms carrying at each of their opposite ends a corresponding permanent magnet;
    wherein said rocker arms are sized in such a way as to be pivotably movable between a first limit position, where said permanent magnets abut against said angularly oriented electromagnets, and a second limit position, where said permanent magnets abut against said floating electromagnets.

2. A differential displacement electromagnetic device as in claim 1,
    wherein said permanent electromagnets fixedly mounted to opposite ends of said carriage are angularly oriented relative to said support frame lengthwise axis by an angular value of about 45°.

3. A differential displacement electromagnetic device as in claim 1,
    wherein said bracket mount carrying two spaced pivotal axles being orthogonal to the plane of said support frame.

4. A differential displacement electromagnetic device as in claim 1,
    wherein said carriage and said block are of substantially the same mass.

5. A differential displacement electromagnetic device as in claim 1,
    in combination with a watercraft, wherein said support frame is fixedly mounted to a lower deck floor of said watercraft.

6. A differential displacement electromagnetic device as in claim 1,
    wherein in operation, said carriage is accelerated linearly in a direction opposite said angularly oriented electromagnets, while said permanent magnets have been accelerated during pivotal motion of said rocker arms, to eventually abut against and remain connected to registering said floating electromagnets, thus bringing a further acceleration of said carriage away from said angularly oriented electromagnets.

7. A differential displacement electromagnetic device as in claim 6,
    wherein said acceleration ratio of said carriage away from said angularly oriented electromagnets is of about 1 to 1.41.

8. A differential displacement electromagnetic device as in claim 1,
    further including first and second pairs of additional permanent magnets, each fixedly mounted to a corresponding one of the two said pairs of said upright anchor columns, said first pair of additional permanent magnets being in spaced register with one another and producing repulsive magnetic forces relative to one another, said second pair of additional permanent magnets being in spaced register with one another and producing repulsive magnetic forces relative to one another, said first and second pairs of additional permanent magnets improving smoothness in operation of said first and second biasing means.

9. A method of use of a differential displacement electromagnetic device providing motion over a support frame, said device of the type comprising: —a planar rectangular support frame defining a lengthwise axis and a central aperture; —first and second integral rails fixedly mounted to said support frame in spacedly parallel fashion relative to one another;

—an open quadrangular carriage, spacedly overhanging over said support frame in sliding fashion; —permanent electromagnets, fixedly mounted to opposite ends of said carriage and angularly oriented relative to said support frame lengthwise axis; two first and second pairs of upright anchor columns, mounted to and projecting transversely from opposite ends of said support frame, said first pair of anchor columns interconnected by first biasing means, while said second pair of anchor columns interconnected by second biasing means; —a movable block, slidingly carried over both said rails and sized to freely engage said support frame aperture for sliding motion thereabout independently of said carriage, said block including a pair of opposite side spring loaded arms, extending outwardly over and beyond said carriage and carrying at each of their opposite ends a pair of opposite floating electromagnets, said floating electromagnets hanging freely spacedly over said support frame and clearing said casing; said block further including a bracket mount carrying two spaced pivotal axles defining pivotal axes transverse to the plane of said support frame, and a pair of fixed rocker arms, pivotally mounted to said block at one end by pivotal axles 62, 64, with each rocker arms carrying at each of their opposite ends a corresponding permanent magnet; wherein said rocker arms are sized in such a way as to be pivotably movable between a first limit position, where said permanent magnets abut against said angularly oriented electromagnets, and a second limit position, where said permanent magnets abut against said floating electromagnets;

wherein said method of use comprises the following steps:

a) at rest, said permanent magnets abut on said angularly oriented electromagnets;

b) a computer control system then applies electrical current to the diverging said angularly oriented electromagnets bringing about a repulsive force on registering said permanent magnets so that the latter move away from angularly oriented electromagnets;

c) simultaneously, said carriage is accelerated linearly in a direction opposite said angularly oriented electromagnets while said permanent magnets have been accelerated during pivotal motion of said rocker arms along their circle of arc, to eventually come to abut against and remain connected to registering said floating electromagnets, thus bringing a further acceleration of said carriage away from said angularly oriented electromagnets;

d) just before said floating electromagnets reach said permanent magnets, said computer control means apply electric current onto said floating electromagnets, which thus brings about simultaneously four electromagnetic repulsion forces: two repulsive forces are applied onto said rocker arms magnets on the one hand, and two other repulsive forces are applied onto said permanent magnets on the other hand; and e) the return pivotal motion of said rocker arms occurs, away from said floating electromagnets and displacement of said carriage and of said block occurs toward said angularly oriented electromagnets to bring all components of the present device to their original position of step (a), ending the cycle.

\* \* \* \* \*